United States Patent
Naito et al.

(10) Patent No.: US 12,152,118 B2
(45) Date of Patent: Nov. 26, 2024

(54) INCISED PREPREG AND FIBER-REINFORCED PLASTIC

(71) Applicant: Toray Industries, Inc., Tokyo (JP)

(72) Inventors: Yuta Naito, Ehime (JP); Kentaro Adachi, Ehime (JP); Hiroaki Matsutani, Ehime (JP)

(73) Assignee: Toray Industries, Inc., Tokyo (JP)

(*) Notice: Subject to any disclaimer, the term of this patent is extended or adjusted under 35 U.S.C. 154(b) by 306 days.

(21) Appl. No.: 17/628,642

(22) PCT Filed: Aug. 3, 2020

(86) PCT No.: PCT/JP2020/029617
§ 371 (c)(1),
(2) Date: Jan. 20, 2022

(87) PCT Pub. No.: WO2021/024971
PCT Pub. Date: Feb. 11, 2021

(65) Prior Publication Data
US 2022/0315718 A1  Oct. 6, 2022

(30) Foreign Application Priority Data
Aug. 6, 2019 (JP) ................................. 2019-144266

(51) Int. Cl.
*C08J 5/24* (2006.01)
(52) U.S. Cl.
CPC ........... *C08J 5/243* (2021.05); *C08J 2363/00* (2013.01); *C08J 2429/14* (2013.01)
(58) Field of Classification Search
CPC . C08J 5/243; C08J 2363/00; Y10T 428/2457; B32B 3/26; B32B 3/266
See application file for complete search history.

(56) References Cited

U.S. PATENT DOCUMENTS

2014/0193683 A1  7/2014  Mardall et al.
2014/0292260 A1  10/2014  Dyer et al.
(Continued)

FOREIGN PATENT DOCUMENTS

JP  2007146151 A1  6/2007

OTHER PUBLICATIONS

International Preliminary Report on Patentability and Written Opinion for International Application No. PCT/JP2020/029617, dated Dec. 15, 2020, 8 pages.
(Continued)

*Primary Examiner* — David Sample
*Assistant Examiner* — Donald M Flores, Jr.
(74) *Attorney, Agent, or Firm* — Buchanan Ingersoll & Rooney PC

(57) ABSTRACT

An object is to provide an incised prepreg having desired formability stably, wherein the incised prepreg contains unidirectionally oriented reinforcing fibers and matrix resin and has an incised region containing a plurality of incisions made to divide reinforcing fibers, wherein the incised region includes a plurality of incision rows, each containing a plurality of incisions having nearly equal fiber-directionally projected lengths and aligned at substantially constant intervals in the fiber direction and wherein the distance L1, measured at right angles to the fiber direction, between two incision rows located on either side of an arbitrarily selected incision row and the fiber-directionally projected length L2 of the latter incision row satisfy the following relation: $-1.0 < L1/L2 < 0.5$.

11 Claims, 7 Drawing Sheets

(56) References Cited

U.S. PATENT DOCUMENTS

| | | |
|---|---|---|
| 2016/0167800 A1 | 6/2016 | Joubert et al. |
| 2016/0297167 A1* | 10/2016 | Crawford, III ......... B29B 15/08 |
| 2017/0297431 A1 | 10/2017 | Epstein et al. |
| 2019/0097282 A1 | 3/2019 | Melack et al. |

OTHER PUBLICATIONS

International Search Report and Written Opinion for International Application No. PCT/JP2020/029617, dated Oct. 13, 2020, 6 pages.

* cited by examiner

[Fig. 1]
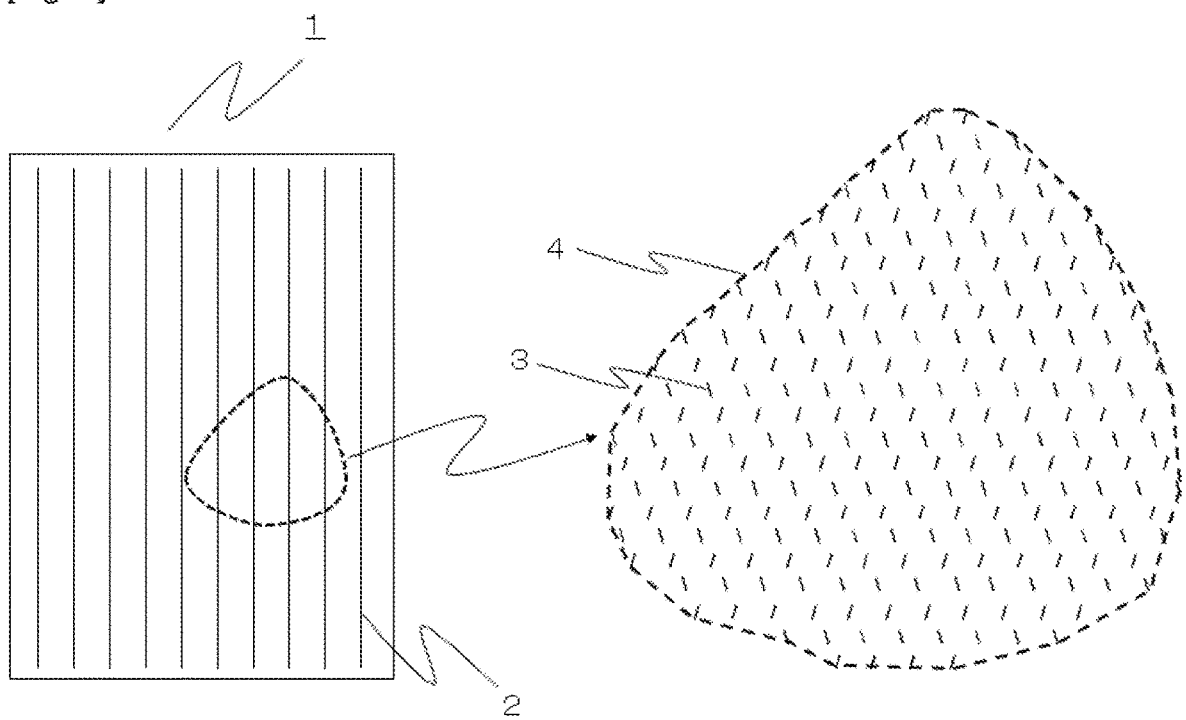

[Fig. 2]
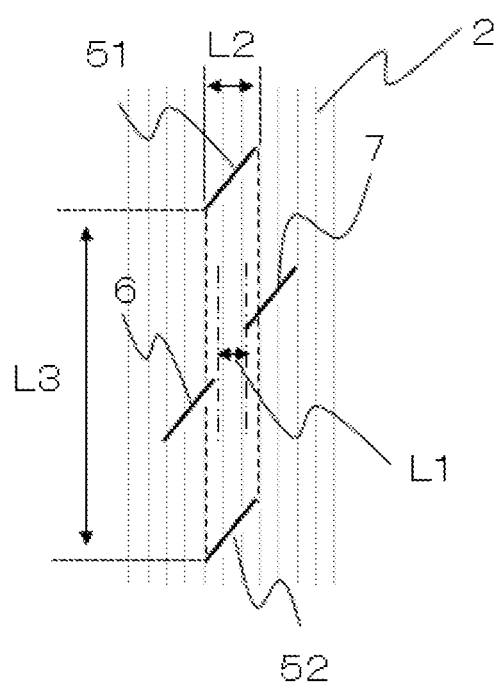
$0 < L1/L2 < 1$

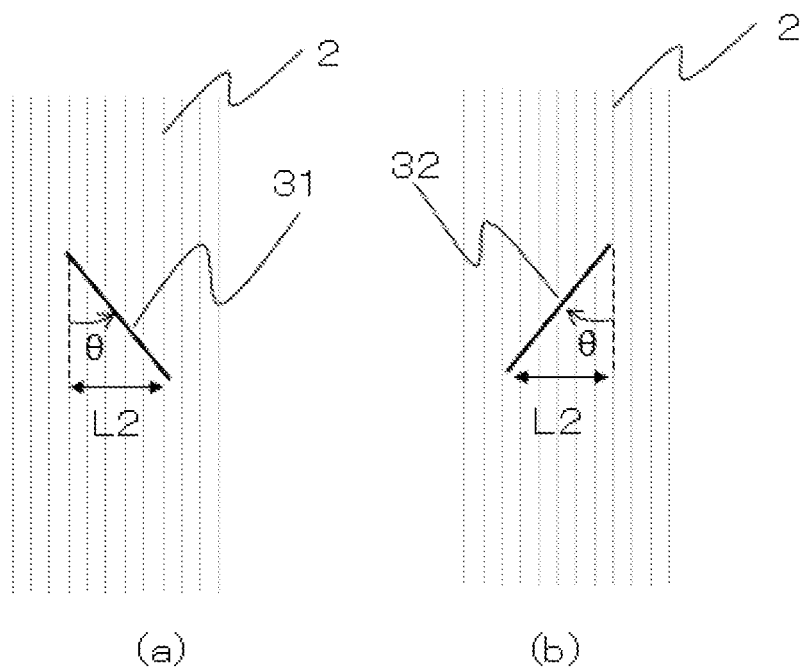
[Fig. 3]

[Fig. 4]
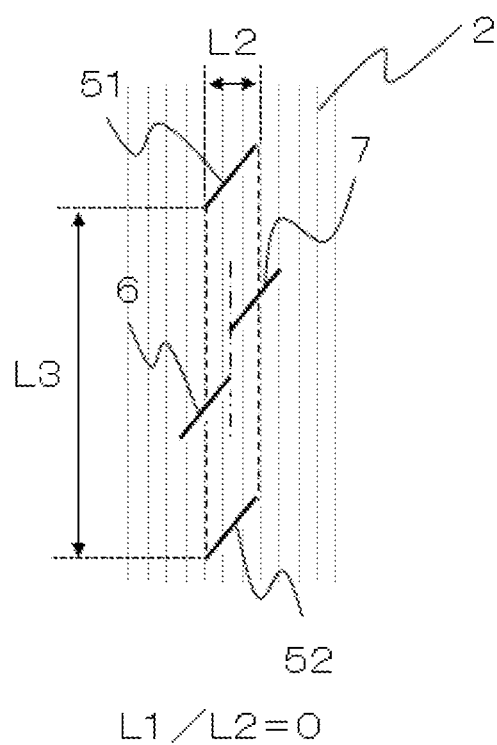
L1/L2=0

[Fig. 5]
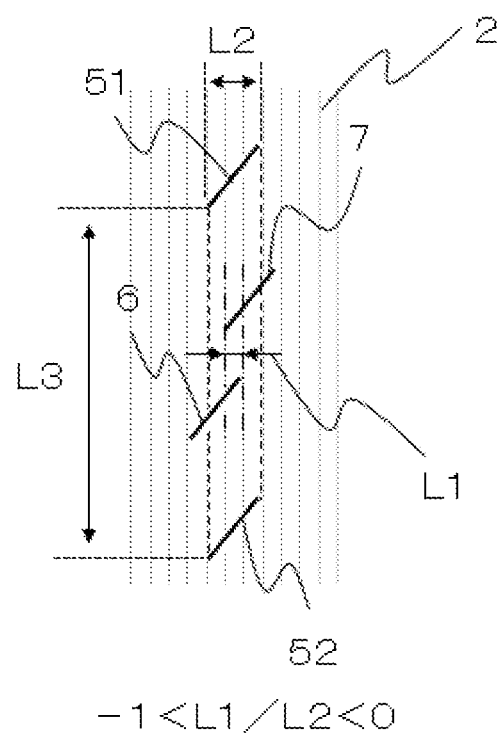

[Fig. 6]
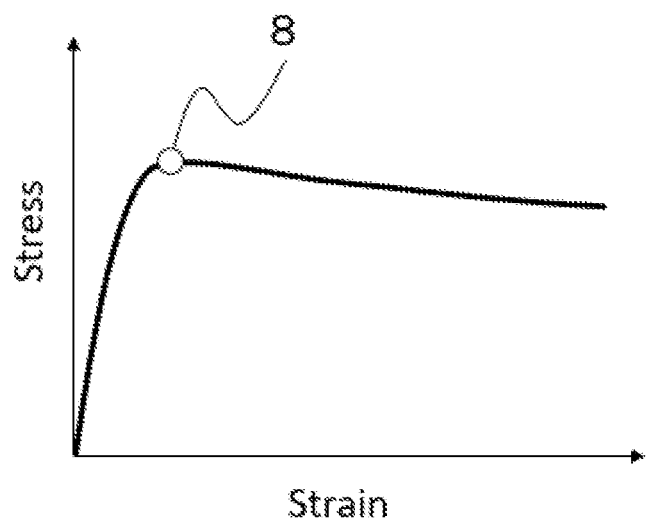

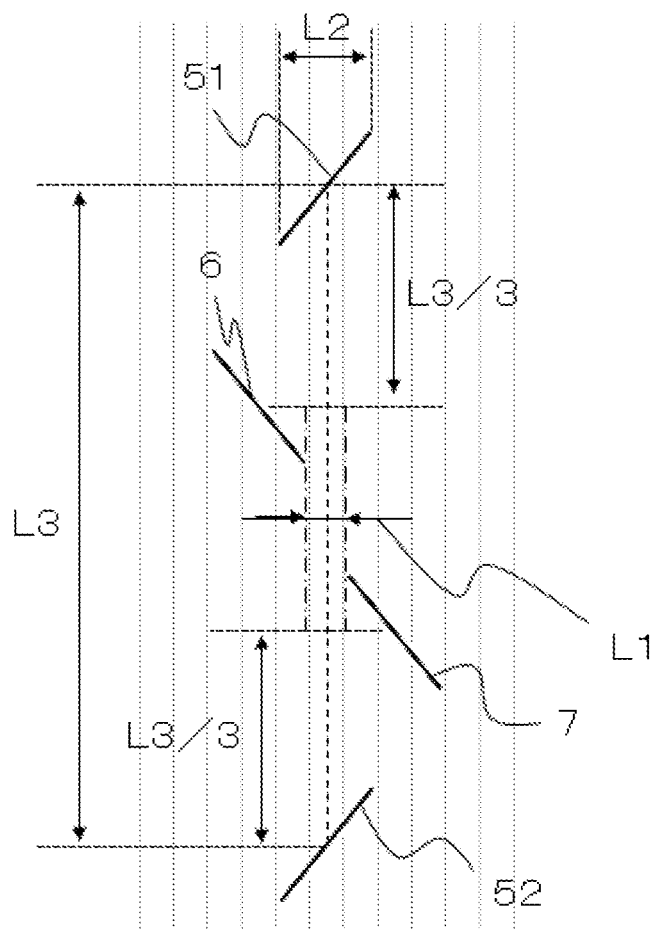

INCISED PREPREG AND FIBER-REINFORCED PLASTIC

CROSS REFERENCE TO RELATED APPLICATIONS

This is the U.S. National Phase application of PCT/JP2020/029617, filed Aug. 3, 2020, which claims priority to Japanese Patent Application No. 2019-144266, filed Aug. 6, 2019, the disclosures of these applications being incorporated herein by reference in their entireties for all purposes.

FIELD OF THE INVENTION

The present invention relates to an incised prepreg including unidirectionally oriented reinforcing fibers and matrix resin and having a plurality of incisions that divide the reinforcing fibers.

BACKGROUND OF THE INVENTION

Fiber reinforced plastic materials generally have a high specific strength, high specific elastic modulus, good mechanical properties, and good functional properties such as high weather resistance and chemical resistance and accordingly, demand for them has been mounting every year.

As an intermediate base material for fiber reinforced plastic materials, prepreg, which is composed mainly of continuous reinforcing fibers impregnated with matrix resin, has been in wide use. A prepreg having an increased content of reinforcing fibers can be obtained by orienting the reinforcing fibers in one direction. This allows the prepreg to have good mechanical properties, but since the reinforcement fibers are in the form of continuous fibers, there is the problem of difficulty in shaping into a complicated shape such as a three dimensional one.

To solve the problem, as an intermediate base material that has both good mechanical properties and high formability, incised prepregs formed mainly of incised reinforcing fibers oriented in one direction have been disclosed (see, for example, Patent document 1). Though formed mainly of discontinuous fibers, such an incised prepreg has a high fiber volume fraction and a high degree of reinforcing fiber orientation, which represent a unique feature of common prepregs, and accordingly, it can be formed into a complicated shape that cannot be realized with conventional continuous fiber prepregs while maintaining good mechanical properties.

PATENT DOCUMENTS

Patent document 1: Japanese Unexamined Patent Publication (Kokai) No. 2007-146151

SUMMARY OF THE INVENTION

The incised prepreg described in Patent document 1, however, occasionally varies in formability depending on the state of the prepreg before being incised even if the same incision pattern is applied. For example, in the case where there are portions left unimpregnated with resin inside a prepreg, the reinforcing fibers located in the portions do not have matrix resin around them, and accordingly the reinforcing fibers can easily deflect during the incision step, often leading to an increase in the actual fiber length compared to the design fiber length. In addition, similar problems tend to occur when the reinforcing fibers contained in the prepreg have large areal weight.

The main object of the present invention is to provide an incised prepreg that can realize a desired formability stably.

To achieve the object, the present invention provides an incised prepreg containing unidirectionally oriented reinforcing fibers and matrix resin and having an incised region containing a plurality of incisions made to divide reinforcing fibers, wherein the incised region includes a plurality of incision rows, each containing a plurality of incisions having nearly equal fiber-directionally projected lengths and aligned at substantially constant intervals in the fiber direction and wherein the distance L1, measured at right angles to the fiber direction, between two incision rows located on either side of an arbitrarily selected incision row and the fiber-directionally projected length L2 of the latter incision row satisfy the relation given below:

$$-1.0 < L1/L2 < 0.5.$$

The present invention can provide a high-formability incised prepreg that can maintain a desired formability stably.

BRIEF DESCRIPTION OF THE DRAWINGS

FIG. 1 provides a schematic diagram of an incised region as defined for the present invention.

FIG. 2 provides a schematic diagram of a typical incision pattern for the present invention.

FIG. 3a and FIG. 3b provide a conceptual diagram illustrating the incision angle.

FIG. 4 provides a schematic diagram of another typical incision pattern for the present invention.

FIG. 5 provides a schematic diagram of another typical incision pattern for the present invention.

FIG. 6 provides a schematic diagram of a stress-strain curve obtained in an example of the present invention.

FIG. 7 provides a schematic diagram of the incision pattern used in Example 1.

DETAILED DESCRIPTION OF THE INVENTION

The term "incised prepreg" used in the present description means a prepreg containing unidirectionally oriented reinforcing fibers and a resin composition and having a region (hereinafter referred to as incised region) wherein a plurality of incisions is inserted to divide reinforcing fibers. The boundary of the incised region is a group of line segments that are formed by interconnecting the end portions of incisions so that the group of line segments embraces therein all the incisions and so that the total length of the group of the line segments is minimized.

FIG. 1 illustrates a schematic diagram of an incised prepreg 1, which is a prepreg containing unidirectionally oriented reinforcing fibers 2 and having an incised region 4 where a plurality of incisions 3 is inserted. The incised region may be the entirety of the incised prepreg. However, incisions may be made only in a portion molded into a three dimensional shape having a curved surface or irregularities, and in such a case, an incised region may be formed at least in the portion of the prepreg molded into a three dimensional shape. A fiber reinforced plastic material can be molded by, for example, heating and pressing an incised prepreg, and in particular, an incised prepreg is used to provide a fiber reinforced plastic material formed by molding an incised region into a three dimensional shape.

The incised prepreg according to the present invention (hereinafter occasionally referred to simply as prepreg) includes unidirectionally oriented reinforcing fibers and a resin composition. The expression "unidirectionally oriented" implies the existence of a "certain direction" such that 90% or more of the reinforcing fibers existing in the prepreg are located within an angle range of ±10° of the "certain direction" in the plane of the prepreg. More preferably, there exist a direction such that 90% or more of the reinforcing fibers are located within an angle range of ±5° of that direction. In the present description, this "certain direction" is referred to as the fiber direction. In addition, the direction perpendicular to the fiber direction in the plane of the prepreg is referred to as the perpendicular-to-fiber direction.

There are no specific limitations on the reinforcing fibers contained in the prepreg and it may be selected from carbon fiber, glass fiber, Kevlar fiber, graphite fiber, boron fiber, and the like. Of these, carbon fiber is preferable from the viewpoint of specific strength and specific stiffness.

There are no specific limitations on the matrix resin contained in the prepreg and it may be either thermoplastic resin or thermosetting resin.

Examples of the thermoplastic resin include, for example, polyamide, polyacetal, polyacrylate, polysulfone, ABS, polyester, acrylic, polybutylene terephthalate (PBT), polycarbonate (PC), polyethylene terephthalate (PET), polyethylene, polypropylene, polyphenylene sulfide (PPS), polyether ether ketone (PEEK), polyether imide (PEI), polyether ketone (PEK), liquid crystal polymer, polyvinyl chloride, polytetrafluoroethylene, other fluorine based resins, and silicone.

Examples of the thermosetting resin include, for example, saturated polyester resin, vinyl ester resin, epoxy resin, benzoxazine resin, phenol resin, urea resin, melanin resin, and polyimide resin. Modified forms of these resins and blends of two or more thereof may also be used. Furthermore, these thermosetting resins may be self-curable by heating or may be blended with a curing agent, a curing accelerator, or the like.

They may also contain certain additives. There are no specific limitations on such additives. For example, thermoplastic resin may be added to improve the toughness and an inorganic filler may be added to improve the electric conductivity. There are no specific limitations on the shape of such additives, and they may be, for example, spherical, non-spherical, needle-like, or whisker-like.

There are no specific limitations on the areal weight of the incised prepreg to use, and it may have any appropriate areal weight. As a preferred effect, the present invention can provide an incised prepreg having stable high formability because the reinforcing fibers are prevented from deflecting or meandering. From the viewpoint of directly preventing the reinforcing fibers from deflecting or meandering in the prepreg incision step described later, the preferred effect can be realized in an incised prepreg having a relatively small areal weight, or more specifically in an incised prepreg containing reinforcing fibers having an areal weight of less than 150 g/m². In such a case, reinforcing fibers with large fiber length in the incised prepreg are prevented from remaining, thereby ensuring a high formability. From the viewpoint of preventing reinforcing fibers with large fiber length from remaining even in the case where there occur some reinforcing fibers deflecting or meandering, on the other hand, the preferred effect can be realized also in an incised prepreg having a relatively large areal weight, or more specifically in an incised prepreg containing reinforcing fibers having an areal weight of 150 g/m² or more. In this case, reinforcing fibers will deflect or meander considerably in the incision forming step and this allows reinforcing fibers with large fiber length to remain more easily. If the L1/L2 ratio is in the range required by the present invention, however, a larger number of reinforcing fibers with large fiber length will be prevented from remaining, leading to a higher formability.

There are no specific limitations on the fiber volume fraction in the incised prepreg. From a similar viewpoint, however, a preferred effect can be realized in an incised prepreg with a high fiber volume fraction in which portions unimpregnated with matrix resin are likely to occur easily. Specifically, the preferred effect is likely to be realized in an incised prepreg with a fiber volume fraction of 50% or more. The fiber volume fraction is more preferably in the range of 60% or more and still more preferably in the range of 65% or more. If the fiber volume fraction is more than 70%, on the other hand, a large number of fibers will be left unincised, possibly leading to deterioration in shape conformity. Accordingly, it is preferable to be 70% or less. For the present description, the fiber volume fraction is defined by the following equation on the basis of the weight content of fibers.

Fiber volume fraction (%)={(weight content of reinforcing fibers)/(density of reinforcing fibers)}/{(weight content of reinforcing fibers)/(density of reinforcing fibers)+(weight content of matrix resin)/(density of matrix resin)}×100

In the incised prepreg according to the present invention, the incised region includes a plurality of incision rows, each containing a plurality of incisions having nearly equal fiber-directionally projected lengths and aligned at substantially constant intervals in the fiber direction. At the same time, the distance L1, measured at right angles to the fiber direction, between two incision rows located on either side of one incision row arbitrarily selected from the above incision rows and the fiber-directionally projected length L2 of that one incision row satisfy the relation given below:

−1.0<L1/L2<0.5.

Hereinafter, such an arrangement pattern of incisions is occasionally referred to as the incision pattern according to the present invention.

FIG. 2 provides a schematic diagram illustrating a typical incision pattern according to the present invention. The "fiber-directionally projected length" means the absolute value of the length L2 of an incision projected in the fiber direction onto a plane of projection that is assumed to stand at right angles to the fiber direction, as illustrated in FIG. 2. Hereinafter, the fiber-directionally projected length and the plane of projection standing at right angles to the fiber direction will be occasionally referred to simply as the projected length and the plane of projection, respectively. In addition, the term "having nearly equal projected lengths" implies that when a plurality of incisions is examined to measure their L2, the incisions having a measured L2 value that gives a ratio to the average (L2/average of measured L2 values) of 0.8 or more and 1.2 or less account for 90% or more. It is preferable that the incisions having a ratio of 0.9 or more and 1.1 or less account for 90% or more, and it is still more preferable that all incisions have the same L2 value. In FIG. 2, the incision A1 and the incision A2, which have nearly equal projected lengths, are aligned in the fiber direction to form a row of incisions (hereinafter referred to as incision row A). In addition, an incision row that includes an incision B (hereinafter referred to as incision row B) runs on the left side while an incision row that includes an incision C (hereinafter referred to as incision row C) runs on the right side. It is noted that only the two of the incision A1 and the incision A2 are shown in FIG. 2 as incisions that form the incision row Awhile only the incision B and the incision C are shown as incisions that form the incision row B and the incision row C, respectively, but actually, each of the incision rows A to C consists of a plurality of incisions aligned at nearly constant intervals in the fiber direction. Here, the expression "nearly constant intervals" implies that when a plurality of incisions contained in an incision row is examined to measure the intervals L3 between the incisions, the measured incision intervals that are within 10 mm or less of the average account for 90% or more. It is preferable that those within 5 mm or less of the average account for 90% or more.

An incision pattern according to the present invention has the feature that the distance L1, measured at right angles to the fiber direction, between two incision rows (the incision row B and the incision row C in FIG. 2) located on either side of an arbitrarily selected incision row (the incision row A in FIG. 2) and the fiber-directionally projected length L2 of the latter incision row (the incision row A in FIG. 2) satisfy the following relation: $-1.0 < L1/L2 < 0.5$. Here, the distance L1 measured at right angles to the fiber direction means the perpendicular-to-fiber distance between the incision end of the incision B nearer to the incision C and the incision end of the incision C nearer to the incision B in FIG. 2.

As described in detail later, if the L1 has a positive value, it means that the incisions belonging to either of the two incision rows do not overlap each other at any position between two mutually adjacent incisions in the arbitrarily selected incision row, whereas a negative value means that the incisions belonging to either of the two incision rows overlap each other. If it is zero, it means that the perpendicular-to-fiber distance between the ends of the incisions belonging to either of the two incision rows is zero.

In the case where $L1/L2 > 1.0$, it means that in the plane of the prepreg, the ends of the incision B and the incision C are located on the outside of the straight lines connecting the ends of the incision A1 and incision A2, the ends being on the same side thereof (in the case where fibers are assumed to be in the vertical direction, they mean either the right-hand ends thereof or left-hand ends thereof, and hereinafter such ends on the same side are referred to simply as the ends). Accordingly, the incision row A and the incision row B (also, the incision row A and the incision row C) do not overlap each other in the plane of projection and run in parallel to each other in the plane of the prepreg.

In the case where $L1/L2 = 1.0$, it means that in the plane of the prepreg, the ends of the incision B and the incision C are located on the straight lines connecting the ends of the incision A1 and incision A2. Accordingly, in regard to the incision row A and the incision row B (also, the incision row A and the incision row C), only the ends of the incision rows that constitute these incision rows overlap each other in the plane of projection while running in parallel to each other in the plane of the prepreg.

In the case where $-1.0 < L1/L2 < 1.0$, furthermore, it means that in the plane of the prepreg, the ends of the incision B and the incision C are located inside of the straight lines connecting the ends of the incision A1 and incision A2. Accordingly, the incision row A and the incision row B (and/or the incision row A and the incision row C) partly overlap each other in the plane of projection. In the present description, the state where $-1.0 < L1/L2 < 1.0$ is occasionally explained by describing that the incision row A and the incision row B, and/or the incision row A and the incision row C, "overlap" each other, and the size of the region that they share is referred to as the "size of the overlap". It is noted that when $L1/L2 \leq -1.0$, the incision row B and the incision row C overlap the incision row A, or the positions of the incision row B and the incision row C can be replaced, resulting in the same state as in the case where $-1.0 < L1/L2 < 0$. Based on the assumption adopted in the present Document, therefore, the relation $L1/L2 > -1.0$ represents both cases.

Incidentally, in the present Document, when two incision rows overlap each other, it is deemed that there exist incision rows distinct from the one selected incision row as long as they are recognized as discrete incision rows having center lines that differ from the center line of the selected incision row. Accordingly, if there exist distinct incision rows on the right- and left-hand sides of the one selected incision row in a planar view of the incised prepreg, it is deemed that there exist two incision rows on either side of the one selected incision row.

As the L1/L2 ratio decreases below 1.0, the overlap between the incision rows (the incision row A and the incision row B, and/or the incision row A and the incision row C) increases. Then, when $L1/L2 = 0$ (that is, when $L1 = 0$), the ends of the incision B and the incision C are aligned along a straight line in the fiber direction as illustrated in FIG. 4, showing that the incision row B and the incision row C run in parallel to each other while overlapping the incision row A with only the ends of the incision rows contained in the incision rows being superposed one on the other.

Then, when $-1.0 < L1/L2 < 0$, the incision row B and the incision row C run in parallel to each other while overlapping the incision row A, and the incision row B and the incision row C themselves overlap each other as illustrated in FIG. 5.

In the case of an incised prepreg that contains a matrix resin with low viscosity or reinforcing fibers with high flexibility, has a prepreg structure containing a portion left unimpregnated with resin, or contains reinforcing fibers with a large areal weight, the reinforcing fibers are likely to deflect in the direction perpendicular to the fibers to dodge the blade in the incision insertion step in the incised prepreg production process, possibly allowing reinforcing fibers with fiber lengths longer than designed to remain uncut. For the present invention, if the relation of $-1.0 < L1/L2 < 0.5$ holds, it works to sufficiently reduce the number of such long reinforcing fibers left uncut in the incision insertion step, making it possible to produce a prepreg with high formability.

It is preferable for the incised prepreg according to the present invention to have an incision pattern that meets the relation of $-1.0 < L1/L2 \leq 0$. In the case where the relation of $-0.2 < L1/L2 \leq 0.2$ holds, even when the reinforcing fibers between the incision B and the incision C are left uncut by these incisions, such reinforcing fibers are located near the center line of the incision A1 and the incision A2 and therefore they are easily incised by the incision A1 and the incision A2. It is more preferable that the relation of $L1/L2 = 0$ holds (FIG. 4) in order to allow the reinforcing fibers left uncut by the above incisions to be located nearer to the center of the incision A1 and the incision A2. Accordingly, this allows substantially all reinforcing fibers in the incision formation region to have fiber lengths shorter than the distance L3 between the incision A1 and the incision A2 measured in the fiber direction (that is, the intervals between the incisions constituting the incision row A). As a result, it possible to produce incised prepregs having stable quality even when there are differences in internal structure (volume of the portions unimpregnated with resin, etc.) among the prepregs. In the case where the relation of $-1.0 < L1/L2 < 0$ holds (FIG. 5), it works to reduce the proportion of fibers that exist between the incision B and the incision C and have a length equal to the interval L3 between the incisions constituting the incision row A. This serves to decrease the load required to form the prepreg into a particular shape. Compared with the case where $L1/L2 = 0$, on the other hand, this may be more preferable some times because reinforcing fibers left uncut can be eliminated more completely, although there can be an influence of the prepreg's internal structure in relation to the incision of the fibers in the overlap between the incision B and the incision C.

There are no specific limitations on the absolute value of the incision angle of each incision from the fiber direction, but it is preferably 2° to 45°. The incision angle refers to the angle θ between the fiber direction and an incision as illustrated in FIGS. 3a and 3b (0°<(absolute value of θ)<90°). If the absolute value of the incision angle is 45° or less, it ensures higher in-plane stretchability and allows the incision to have a smaller opening. If the absolute value of the incision angle is smaller than 2°, on the other hand, it will be difficult to make incisions stably. Mechanical properties will improve considerably if the absolute value of the angle is 25° or less, and accordingly, it is more preferably 2° to 25°, particularly preferably 5° to 15°.

There are no specific limitations on the incision length of each incision, but after setting a particular incision angle, it is preferable to adjust the incision length so that the fiber-directional projected length L2 of the incision row is in the range of 30 μm to 1.5 mm. A smaller L2 value is likely to lead to a decrease in the number of reinforcing fibers cut by one incision to ensure an increased strength. In particular, an L2 of 1.5 mm or less is expected to serve for realizing a large increase in strength. If the L2 is smaller than 30 μm, on the other hand, the fibers will deflect and will not be incised as desired, possibly leading to a decrease in shape conformity in the forming step.

A more preferred embodiment of the present invention provides an incised prepreg in which all incisions contained in the incised region have the same absolute incision angle and the same incision length. The expression of "having the same absolute incision angle" means that for all incisions, the absolute value of the incision angle is within the range of ±1° of the average calculated from the absolute values of angle θ of all incisions. On the other hand, the expression of "having the same incision length" means that for all incisions, the incision length is within ±5% of the average. If such a pattern is used, it serves to produce an incised prepreg with a controlled variation in physical properties in the incised region.

Another preferred embodiment of the present invention provides an incised prepreg containing one selected incision row and other two incision rows located on either side thereof that have incision angles with opposite signs to the fiber direction as illustrated in FIG. 7. Here, the incision angle of an incision is an acute angle measured from a straight line in the fiber direction to that incision, and the incision angle is positive when the measuring direction is counterclockwise as in the case of the incision 31 in FIG. 3(a) whereas the incision angle is negative when the measuring direction is clockwise as in the case of the incision 32 in FIG. 3(b). This embodiment serves to achieve more uniform physical properties. In the incision insertion step in the incised prepreg production process, furthermore, meandering of the mother prepreg can be controlled to provide an incised prepreg with stable quality.

In addition, the adoption of the incision pattern according to the present invention makes it easy to control the average fiber length of the incised reinforcing fibers within an appropriate range even if the intervals (L3 in FIG. 2) between the incisions constituting each incision row are increased. Therefore, an incised prepreg with very high formability can be produced even when the intervals between the incisions in each incision row are relatively large. Accordingly, the production cost can be decreased because, for examples, the number of blades required in the incision insertion step can be reduced. Here, it is preferable for the intervals between the incisions in each incision row to be 200 mm or less, more preferably 100 mm or less, from the viewpoint of ensuring a minimum required stretchability and formability. On the other hand, it is preferably 20 mm more from the viewpoint of ensuring required mechanical properties. It is preferably 30 mm more and more preferably 50 mm more in order to obtain an incised prepreg with good mechanical properties.

The average fiber length over the incised region in an incised prepreg is preferably 10 mm to 100 mm. A shorter average fiber length leads to a higher formability, but results in a carbonfiber reinforced plastic material with deteriorated mechanical properties. A longer average fiber length leads to a lower formability, but results in a carbon fiber reinforced plastic material with improved mechanical properties. From the viewpoint of the formability of a prepreg and mechanical properties of the resulting carbon fiber reinforced plastic material, the average fiber length is preferably in the range of 10 to 100 mm and more preferably 15 to 50 mm.

There are no specific limitations on the method to use for the production of the incised prepreg according to the present invention, but it is preferable to use a rotary blade roller or an intermittent cutting blade roller to make incisions in a prepreg from the viewpoint of productivity.

The incised prepreg is preferred because the use thereof serves to produce molded fiber reinforced plastic materials in three dimensional or other complicated shapes and such fiber reinforced plastic materials can work in various fields as members that are required to have complicated shapes.

It is particularly preferred when the aforementioned incised region in these fiber reinforced plastic materials is to be molded in a three dimensional shape because fiber reinforced plastics with high dimensional accuracy can be obtained because the incised prepreg is high in conformity to a three dimensional shape.

EXAMPLES

Hereinafter, the present invention will be further concretely described with reference to examples. However, the present invention is not limited to those aspects of the inventions described in the examples.

<Formability Evaluation>

An incised prepreg is prepared and cut to a size of 25 mm perpendicular to the fiber direction×150 mm parallel to the fiber direction, and then it is set in the temperature controlled bath in a Shimadzu universal tester (manufactured by Shimadzu Corporation), followed by pulling in the fiber direction under the conditions of a temperature of 100° C. and a tension speed of 100 mm/min.

FIG. 6 provides a schematic diagram showing a stress-strain curve obtained in this evaluation. As seen in FIG. 6, the stress on the incised prepreg increased up to a certain value and then decreased gradually. The maximum stress value reached in this tensile test indicates the stress required to stretch the incised prepreg largely. Thus, this value was defined as deformation resistance stress and used as an indicator of formability.

In the examples, the evaluation 1 and the evaluation 2 described below were implemented.

Evaluation 1: After producing a continuous fiber prepreg P, a heating and pressing step is performed on the continuous fiber prepreg P to improve the degree of matrix resin impregnation, thus providing a continuous fiber prepreg Q. To evaluate the difference in deformation resistance stress between them, the deformation resistance stress ratio 1, which is defined by the equation given below, was used as an indicator of formability.

Deformation resistance stress ratio 1=(deformation resistance stress of incised prepreg produced by making incision pattern in continuous fiber prepreg $P$)/(deformation resistance stress of incised prepreg produced by making incision pattern in continuous fiber prepreg $Q$)

Evaluation 2: To evaluate the difference in deformation resistance stress between a continuous fiber prepreg P prepared above and a continuous fiber prepreg R with smaller areal weight than continuous fiber prepreg P, the deformation resistance stress ratio 2, which is defined by the equation given below, was used as an indicator of formability.

Deformation resistance stress ratio 2=(deformation resistance stress of incised prepreg produced by making incision pattern in continuous fiber prepreg P)/(deformation resistance stress of incised prepreg produced by making incision pattern in continuous fiber prepreg R)

Here, as the deformation resistance stress ratio comes closer to 1.0, it means that the structure of the incision-free continuous fiber prepreg has less influence, leading to a smaller difference in formability. On the other hand, as the deformation resistance stress ratio increases, it means that the formability of the incised prepreg depends more significantly on the structure of the incision-free continuous fiber prepreg.

<Preparation of Continuous Fiber Prepreg>

An epoxy resin mixture (35 parts by weight of jER® 828, 30 parts by weight of jER® 1001, and 35 parts by weight of jER® 154, manufactured by Japan Epoxy Resins Co., Ltd.) was heat-kneaded with 5 parts by weight of a thermoplastic polyvinyl formal resin (Vinylec® K, manufactured by Chisso Corporation) in a kneader to ensure uniform dissolution of the polyvinyl formal resin, followed by kneading with 3.5 parts by weight of dicyandiamide (DICY7, manufactured by Japan Epoxy Resins Co., Ltd.) and 4 parts by weight of 3-(3,4-dichlorophenyl)-1,1-dimethylurea (DCMU99, manufactured by Hodogaya Chemical Co., Ltd.), which are adopted as curing agent and curing accelerator, respectively, in the kneader to prepare an uncured epoxy resin composition. Using a reverse roll coater, this epoxy resin composition was spread over silicone-coated release paper to prepare resin films with an areal weight of 50 g/m² or 25 g/m².

Before producing incised prepregs, continuous fiber prepregs P and Q to use for their production were prepared by the method described below.

Two resin film sheets having an areal weight of 50 g/m² prepared by the procedure described above were attached to both sides of a unidirectionally oriented carbon fiber sheet (T700S, manufactured by Toray Industries, Inc.) having an areal weight of 200 g/m², and it was impregnated with the resin under the conditions of a temperature of 60° C. and a pressure of 1 MPa to provide a continuous fiber prepreg P having a fiber volume fraction of 58%.

Furthermore, a continuous fiber prepreg Q was prepared by maintaining the continuous fiber prepreg P in a vacuum at a temperature of 90° C. for 5 minutes to ensure a higher degree of resin impregnation.

In addition, two resin film sheets having an areal weight of 25 g/m² prepared by the procedure described above were attached to both sides of a unidirectionally oriented carbon fiber sheet (T700S, manufactured by Toray Industries, Inc.) having an areal weight of 100 g/m², and it was impregnated with the resin under the conditions of a temperature of 60° C. and a pressure of 1 MPa to provide a continuous fiber prepreg R having a fiber volume fraction of 58%.

Example 1

Incisions were made in the continuous fiber prepreg P and the continuous fiber prepreg Q in the incision pattern illustrated in FIG. 7 in such a manner that all incisions had an incision length of 3 mm, an absolute incision angle θ of 20°, an L1/L2 ratio of 0.2, and an incision interval L3 of 60 mm. Using a rotary cutter, incisions were made over the entirety of each prepreg to produce incised prepregs.

Example 2

Except that L1/L2=0, the same procedure as in Example 1 was carried out to produce incised prepregs.

Example 3

Except that L1/L2=−0.2, the same procedure as in Example 1 was carried out to produce incised prepregs.

Example 4

Incisions were made in the continuous fiber prepreg P and the continuous fiber prepreg R in the incision pattern illustrated in FIG. 7 in such a manner that all incisions had a length of 3 mm, an absolute incision angle θ of 20°, an L1/L2 ratio of 0.2, and an incision interval L3 of 60 mm. Using a rotary cutter, incisions were made over the entirety of each prepreg to produce incised prepregs.

Example 5

Except that L1/L2=0, the same procedure as in Example 4 was carried out to produce incised prepregs.

Example 6

Except that L1/L2=−0.2, the same procedure as in Example 4 was carried out to produce incised prepregs.

Comparative Example 1

Except that L1/L2=1.0 and that the interval between the incisions was 30 mm with the aim of allowing the average fiber length to be close to that in Examples 1 to 3, the same procedure as in Example 1 was carried out to produce incised prepregs.

Comparative Example 2

Except that L1/L2=1.2, the same procedure as in Comparative example 1 was carried out to produce incised prepregs. Formability evaluation was implemented and it was found that the sample did not show the behavior of giving a certain specific stress value in the stress-strain curve diagram due to the existence of continuous fibers. Thus, the stress generated was so large that it was impossible to obtain a specific deformation resistance stress value.

Comparative Example 3

Except that L1/L2=1.0 and that the interval between the incisions was 30 mm with the aim of allowing the average fiber length to be close to that in Examples 4 to 6, the same procedure as in Example 4 was carried out to produce incised prepregs.

Major features of the incision patterns in the incised prepregs prepared in Examples and Comparative examples are shown in Table 1, and results of their formability evaluation and moldings' mechanical property evaluation are shown in Table 2.

TABLE 1

|  | Example 1 | Example 2 | Example 3 | Example 4 | Example 5 | Example 6 | Comparative example 1 | Comparative example 2 | Comparative example 3 |
|---|---|---|---|---|---|---|---|---|---|
| Incision length [mm] | 3 | 3 | 3 | 3 | 3 | 3 | 3 | 3 | 3 |
| Absolute value of the incision angle θ [°] | 20 | 20 | 20 | 20 | 20 | 20 | 20 | 20 | 20 |
| L1/L2 | 0.2 | 0 | −0.2 | 0.2 | 0 | −0.2 | 1.0 | 1.2 | 1.0 |
| Interval of incisions L3 [mm] | 60 | 60 | 60 | 60 | 60 | 60 | 30 | 30 | 30 |

TABLE 2

|  |  | Example 1 | Example 2 | Example 3 | Example 4 | Example 5 | Example 6 | Comparative example 1 | Comparative example 2 | Comparative example 3 |
|---|---|---|---|---|---|---|---|---|---|---|
| Deformation resistance stress [MPa] | Prepreg P | 2.50 | 0.40 | 0.40 | 2.50 | 0.40 | 0.40 | 3.90 | — | 3.90 |
|  | Prepreg Q | 0.80 | 0.30 | 0.20 | — | — | — | 0.90 | — | — |
|  | Prepreg R | — | — | — | 0.70 | 0.20 | 0.15 | — | — | 0.80 |
| Deformation resistance stress ratio |  | 3.1 | 1.3 | 2.0 | 3.6 | 2.0 | 2.7 | 4.3 | — | 4.9 |

EXPLANATION OF NUMERALS

1: prepreg
2: reinforcing fiber
3: incision
31: incision of positive angle
32: incision of negative angle
4: incised region
51: incision A1
52: incision A2
6: incision B
7: incision C
8: deformation resistance stress

The invention claimed is:

1. An incised prepreg comprising unidirectionally oriented reinforcing fibers and matrix resin and having an incised region containing a plurality of incisions that divide the reinforcing fibers, the incised region including a plurality of incision rows, each containing a plurality of incisions having nearly equal fiber-directionally projected lengths and aligned at substantially constant intervals in the fiber direction, and the relation given below being satisfied:

$$-1.0 < L1/L2 < 0.5$$

wherein L1 is the distance, measured at right angles to the fiber direction, between two incision rows located on either side of one arbitrarily selected incision row and L2 is the fiber-directionally projected length of that one arbitrarily selected incision row, and
wherein L2 is in a range of 30 μm to 1.5 mm.

2. The incised prepreg as set forth in claim 1, wherein the following relation is satisfied:

$$-1.0 < L1/L2 \leq 0.$$

3. The incised prepreg as set forth in claim 2, wherein the following relation is satisfied:

$$L1/L2 = 0.$$

4. The incised prepreg as set forth in claim 2, wherein the following relation is satisfied:

$$-1.0 < L1/L2 < 0.$$

5. The incised prepreg as set forth in claim 1, wherein the arbitrarily selected incision row and the incision rows located on either side thereof have incision angles from a fiber direction with opposite signs.

6. The incised prepreg as set forth in claim 1, wherein an incision angle from a fiber direction in the arbitrarily selected incision row and that in each incision row located on either side thereof have the same absolute value.

7. The incised prepreg as set forth in claim 1, wherein the incisions in the incision rows are located at intervals of 20 mm or more.

8. The incised prepreg as set forth in claim 1, wherein the average fiber length of the reinforcing fibers in the incised region is 10 to 100 mm.

9. The incised prepreg as set forth in claim 1, wherein a fiber volume fraction of the incised prepreg is 50% or more.

10. A fiber reinforced composite plastic material produced from the incised prepreg as set forth in claim 1.

11. The fiber reinforced composite plastic material as set forth in claim 10, wherein the incised region is molded in a three dimensional shape.

* * * * *